US008098770B2

(12) United States Patent
Shusterman

(10) Patent No.: US 8,098,770 B2
(45) Date of Patent: Jan. 17, 2012

(54) UNBIASED SIGNAL-TO-NOISE RATIO ESTIMATION FOR RECEIVER HAVING CHANNEL ESTIMATION ERROR

(75) Inventor: Eliahu Shusterman, Kfar Saba (IL)

(73) Assignee: Broadcom Corporation, Irvine, CA (US)

( * ) Notice: Subject to any disclaimer, the term of this patent is extended or adjusted under 35 U.S.C. 154(b) by 888 days.

(21) Appl. No.: 12/115,632

(22) Filed: May 6, 2008

(65) Prior Publication Data

US 2009/0279643 A1  Nov. 12, 2009

(51) Int. Cl.
*H03D 3/22* (2006.01)
(52) U.S. Cl. ........ 375/329; 375/322; 375/316; 375/219; 375/340; 370/504; 370/505; 370/506; 370/515; 455/73
(58) Field of Classification Search .................. 375/329, 375/322, 316, 219, 340; 370/504, 505, 506, 370/515; 455/73
See application file for complete search history.

(56) References Cited

U.S. PATENT DOCUMENTS

| | | | |
|---|---|---|---|
| 3,836,888 A | 9/1974 | Boenke et al. |
| 4,413,229 A | 11/1983 | Grant |
| 4,536,875 A | 8/1985 | Kume et al. |
| 4,608,685 A | 8/1986 | Jain et al. |
| 4,893,326 A | 1/1990 | Duran et al. |
| 5,052,029 A | 9/1991 | James et al. |
| 5,343,240 A | 8/1994 | Yu |
| 5,421,030 A | 5/1995 | Baran |
| 5,440,335 A | 8/1995 | Beveridge |
| 5,570,355 A | 10/1996 | Dail et al. |
| 5,671,220 A | 9/1997 | Tonomura |
| 5,796,739 A | 8/1998 | Kim et al. |
| 5,802,173 A | 9/1998 | Hamilton-Piercy et al. |
| 5,805,591 A | 9/1998 | Naboulsi et al. |
| 5,805,806 A | 9/1998 | McArthur |
| 5,815,662 A | 9/1998 | Ong |
| 5,822,677 A | 10/1998 | Peyrovian |
| 5,822,678 A | 10/1998 | Evanyk |
| 5,845,190 A | 12/1998 | Bushue et al. |
| 5,850,400 A | 12/1998 | Eames et al. |

(Continued)

FOREIGN PATENT DOCUMENTS

EP  0 385695  9/1990

(Continued)

OTHER PUBLICATIONS

International Search Report for International Appl. No. PCT/US03/27253 dated Dec. 30, 2003 (4 pgs.).

(Continued)

*Primary Examiner* — David C. Payne
*Assistant Examiner* — Zewdu Kassa
(74) *Attorney, Agent, or Firm* — Weiss & Arons LLP

(57) ABSTRACT

Apparatus and methods for estimating transmission noise in a programming information signal. Channel noise power in binary phase shift keying ("BPSK") modulated telecommunication may be estimated. Such a method may include receiving over the channel a reference signal and a data BPSK signal. The data BPSK signal may include the programming information. The method may include formulating a channel transfer function estimate for the channel based on the reference signal. The estimate may include a channel estimation error. The data BPSK signal may be equalized using the transfer function estimate. The data BPSK signal may include noise, which may be quantified in terms of power. The data BPSK signal noise power may be estimated in such a manner that is independent of the channel estimation error.

13 Claims, 3 Drawing Sheets

U.S. PATENT DOCUMENTS

| | | | |
|---|---|---|---|
| 5,854,887 A | 12/1998 | Kindell et al. |
| 5,856,975 A | 1/1999 | Rostoker et al. |
| 5,877,821 A | 3/1999 | Newlin et al. |
| 5,886,732 A | 3/1999 | Humpleman |
| 5,896,556 A | 4/1999 | Moreland et al. |
| 5,917,624 A | 6/1999 | Wagner |
| 5,930,493 A | 7/1999 | Ottesen et al. |
| 5,963,844 A | 10/1999 | Dail |
| 5,982,784 A | 11/1999 | Bell |
| 6,009,465 A | 12/1999 | Decker et al. |
| 6,028,860 A | 2/2000 | Laubach et al. |
| 6,055,242 A | 4/2000 | Doshi et al. |
| 6,069,588 A | 5/2000 | O'Neill, Jr. |
| 6,081,519 A | 6/2000 | Petler |
| 6,081,533 A | 6/2000 | Laubach et al. |
| 6,111,911 A | 8/2000 | Sanderford et al. |
| 6,118,762 A | 9/2000 | Nomura et al. |
| 6,157,645 A | 12/2000 | Shobatake |
| 6,167,120 A | 12/2000 | Kikinis |
| 6,219,409 B1 | 4/2001 | Smith et al. |
| 6,229,818 B1 | 5/2001 | Bell |
| 6,243,413 B1 | 6/2001 | Beukema |
| 6,304,552 B1 | 10/2001 | Chapman et al. |
| 6,307,862 B1 | 10/2001 | Silverman |
| 6,466,651 B1 | 10/2002 | Dailey |
| 6,481,013 B1 | 11/2002 | Dinwiddie et al. |
| 6,526,070 B1 | 2/2003 | Bernath |
| 6,553,568 B1 | 4/2003 | Fijolek et al. |
| 6,563,829 B1 | 5/2003 | Lyles et al. |
| 6,611,537 B1 | 8/2003 | Edens et al. |
| 6,622,304 B1 | 9/2003 | Carhart |
| 6,637,030 B1 | 10/2003 | Klein |
| 6,650,624 B1 | 11/2003 | Quigley et al. |
| 6,745,392 B1 | 6/2004 | Basawapatna et al. |
| 6,763,032 B1 | 7/2004 | Rabenko et al. |
| 6,816,500 B1 | 11/2004 | Mannette et al. |
| 6,831,899 B1 | 12/2004 | Roy |
| 6,862,270 B1 | 3/2005 | Ho |
| 6,950,399 B1 | 9/2005 | Bushmitch et al. |
| 6,985,437 B1 | 1/2006 | Vogel |
| 6,996,198 B2 | 2/2006 | Cvetkovic |
| 7,035,270 B2 | 4/2006 | Moore et al. |
| 7,065,779 B1 | 6/2006 | Crocker et al. |
| 7,089,580 B1 | 8/2006 | Vogel et al. |
| 7,116,685 B2 | 10/2006 | Brown et al. |
| 7,127,734 B1 | 10/2006 | Amit |
| 7,133,697 B2 | 11/2006 | Judd et al. |
| 7,146,632 B2 | 12/2006 | Miller |
| 7,194,041 B2 | 3/2007 | Kadous |
| 7,292,527 B2 | 11/2007 | Zhou et al. |
| 7,296,083 B2 | 11/2007 | Barham et al. |
| 7,327,754 B2 | 2/2008 | Mills et al. |
| 7,487,532 B2 | 2/2009 | Robertson et al. |
| 7,532,693 B1 | 5/2009 | Narasimhan |
| 7,606,256 B2 | 10/2009 | Vitebsky et al. |
| 7,653,164 B2 | 1/2010 | Lin et al. |
| 7,675,970 B2 | 3/2010 | Nemiroff et al. |
| 2001/0039660 A1 | 11/2001 | Vasilevsky |
| 2002/0010562 A1 | 1/2002 | Schleiss et al. |
| 2002/0021465 A1 | 2/2002 | Moore et al. |
| 2002/0059623 A1 | 5/2002 | Rodriguez et al. |
| 2002/0059634 A1 | 5/2002 | Terry et al. |
| 2002/0069417 A1 | 6/2002 | Kliger |
| 2002/0078247 A1 | 6/2002 | Lu et al. |
| 2002/0078249 A1 | 6/2002 | Lu et al. |
| 2002/0097821 A1 | 7/2002 | Hebron et al. |
| 2002/0136231 A1 | 9/2002 | Leathurbury et al. |
| 2002/0141347 A1 | 10/2002 | Harp et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194605 A1 | 12/2002 | Cohen et al. |
| 2003/0013453 A1 | 1/2003 | Lavaud et al. |
| 2003/0016751 A1 | 1/2003 | Vetro et al. |
| 2003/0063563 A1 | 4/2003 | Kowalski |
| 2003/0066082 A1 | 4/2003 | Kliger |
| 2003/0099253 A1 | 5/2003 | Kim |
| 2003/0152059 A1 | 8/2003 | Odman |
| 2003/0169769 A1 | 9/2003 | Ho et al. |
| 2003/0193619 A1 | 10/2003 | Farrand |
| 2003/0198244 A1 | 10/2003 | Ho et al. |
| 2004/0037366 A1 | 2/2004 | Crawford |
| 2004/0107445 A1 | 6/2004 | Amit |
| 2004/0163120 A1 | 8/2004 | Rabenko et al. |
| 2004/0177381 A1 | 9/2004 | Kliger |
| 2004/0224715 A1 | 11/2004 | Rosenlof et al. |
| 2004/0258062 A1 | 12/2004 | Narvaez |
| 2005/0115703 A1 | 1/2005 | Terry et al. |
| 2005/0152359 A1 | 7/2005 | Giesberts et al. |
| 2005/0175027 A1 | 8/2005 | Miller et al. |
| 2005/0204066 A9 | 9/2005 | Cohen et al. |
| 2005/0213405 A1 | 9/2005 | Stopler |
| 2006/0062250 A1 | 3/2006 | Payne, III |
| 2006/0078001 A1 | 4/2006 | Chandra et al. |
| 2006/0256799 A1 | 11/2006 | Eng |
| 2006/0256818 A1 | 11/2006 | Shvodian et al. |
| 2006/0268934 A1 | 11/2006 | Shimizu et al. |
| 2006/0280194 A1 | 12/2006 | Jang et al. |
| 2007/0025317 A1 | 2/2007 | Bolinth et al. |
| 2007/0127373 A1 | 6/2007 | Ho et al. |
| 2007/0160213 A1 | 7/2007 | Un et al. |
| 2007/0206551 A1 | 9/2007 | Moorti et al. |
| 2008/0030265 A1* | 2/2008 | Ido et al. ............... 329/317 |
| 2008/0037589 A1 | 2/2008 | Kliger |
| 2008/0117919 A1 | 5/2008 | Kliger |
| 2008/0117929 A1 | 5/2008 | Kliger |
| 2008/0130779 A1 | 6/2008 | Levi |
| 2008/0178229 A1 | 7/2008 | Kliger |
| 2008/0189431 A1 | 8/2008 | Hyslop et al. |
| 2008/0225832 A1 | 9/2008 | Kaplan et al. |
| 2008/0238016 A1 | 10/2008 | Chen et al. |
| 2008/0259957 A1 | 10/2008 | Kliger |
| 2008/0271094 A1 | 10/2008 | Kliger |
| 2008/0298241 A1 | 12/2008 | Ohana |
| 2009/0010263 A1 | 1/2009 | Ma et al. |
| 2009/0060015 A1* | 3/2009 | Beadle ............... 375/227 |
| 2009/0165070 A1 | 6/2009 | McMullin |
| 2009/0217325 A1 | 8/2009 | Kliger |
| 2009/0316589 A1 | 12/2009 | Shafeeu |
| 2010/0031297 A1 | 2/2010 | Klein |
| 2010/0158013 A1 | 6/2010 | Kliger |
| 2010/0158021 A1 | 6/2010 | Kliger |
| 2010/0158022 A1 | 6/2010 | Kliger |
| 2010/0238932 A1 | 9/2010 | Kliger |
| 2010/0246586 A1 | 9/2010 | Ohana |
| 2010/0254278 A1 | 10/2010 | Kliger |
| 2010/0254402 A1 | 10/2010 | Kliger |
| 2010/0284474 A1 | 11/2010 | Kliger |
| 2010/0290461 A1 | 11/2010 | Kliger |

FOREIGN PATENT DOCUMENTS

| | | |
|---|---|---|
| EP | 0 622926 | 11/1994 |
| EP | 1501326 A1 | 1/2005 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Appl. No. PCT/US03/27254 dated Feb. 3, 2004 (5 pgs.).

Multichannel News , MoCA Brewing Up Bigger Bandwidth, Dec. 15, 2008 Interview with CTO Anton Monk, http://www.multichannel.com/article/160878-MoCa_Brewing_Up_bigger_Bandwidth.php downloaded on Mar. 29, 2009.

* cited by examiner

UNBIASED SIGNAL-TO-NOISE RATIO ESTIMATION FOR RECEIVER HAVING CHANNEL ESTIMATION ERROR

FIELD OF THE INVENTION

The present invention relates generally to denial of benefits from transmitted information based on unauthorized use of a device that receives the information.

BACKGROUND OF THE INVENTION

Many structures, including homes, have networks based on coaxial cable ("coax"). The networks are used for distributing video, audio, textual and any other suitable information, and any information related thereto, to network nodes in the structure. The different types of information that may be distributed may be referred to herein as "programming information."

An organization known as The Multimedia over Coax Alliance ("MoCA™") provides industry standards (hereinafter referred to as "MoCA") under which the networks may be operated. MoCA™ provides at its website (www.mocalliance.org) an example of a specification which is hereby incorporated herein by reference in its entirety, for networking of digital video and entertainment information through coaxial cable. The specification has been distributed to an open membership.

Technologies available under the trademark MoCA, other specifications and related technologies ("the existing technologies") often utilize unused bandwidth available on the coax. For example, coax has been installed in more than 70% of homes in the United States. Some homes have existing coax in one or more primary entertainment consumption locations such as family rooms, media rooms and master bedrooms. The existing technologies allow homeowners to utilize installed coax as a networking system and to deliver entertainment and information programming with high quality of service ("QoS").

The existing technologies may provide high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Networks based on the existing technologies can be used as a backbone for multiple wireless access points to extend the reach of wireless service in the structure.

Existing technologies provide throughput through the existing coaxial cables to the places where the video devices are located in a structure without affecting other service signals that may be present on the cable. The existing technologies provide a link for digital entertainment, and may act in concert with other wired and wireless networks to extend entertainment throughout the structure.

The existing technologies work with access technologies such as asymmetric digital subscriber lines ("ADSL"), very high speed digital subscriber lines ("VDSL"), and Fiber to the Home ("FTTH"), which provide signals that typically enter the structure on a twisted pair or on an optical fiber, operating in a frequency band from a few hundred kilohertz to 8.5 MHz for ADSL and 12 MHz for VDSL. As services reach such a structure via any type of digital subscriber line ("xDSL") or FTTH, they may be routed via the existing technologies and the coax to the video devices. Cable functionalities, such as video, voice and Internet access, may be provided to the structure, via coax, by cable operators, and use coax running within the structure to reach individual cable service consuming devices in the structure. Typically, functionalities of the existing technologies run along with cable functionalities, but on different frequencies.

The programming information may be encoded using orthogonal frequency division multiplexing ("OFDM") or any other suitable encoding scheme. The programming information may be modulated using any suitable modulation scheme, including binary phase shift keying ("BPSK"). The receivers often include bit allocation functions for allocating receiver processing bits to individual OFDM channels. The bit allocation requires an estimate of transmission noise in a signal that communicates the programming information.

Normally, a known signal, such as the Probe 1 signal (defined in the aforementioned MoCA specification) is transmitted to the receiver. The receiver generates a "transmitted" signal by demodulating the signal. The received "transmitted" signal is then, in the physical layer ("PHY"), compared to the known signal, or (in a decision-directed approach) to a "decision" based on the received "transmitted" signal. Any differences between the two signals are defined as "noise", which may be referred to herein as "transmission noise."

Demodulation, however, requires carrier channel estimation, whose accuracy is subject to channel noise. Channel noise introduces error into the channel estimation. The error introduces bias into the estimation of transmission noise. The bias can degrade the quality of bit allocation and can therefore degrade signal quality.

For example, the MoCA Probe1 signal payload includes BPSK data generated by a transmitter scrambler. When the same scrambler is used in the receiver, the noise can be estimated by subtracting the known signal from the estimated one, as follows:

$$\hat{MSE}_k = \frac{1}{L}\sum_{n=1}^{L} |\hat{x}_k(n) - x_k(n)|^2 = \frac{1}{L}\sum_{i=1}^{L} |w_k(n)|^2 \approx \sigma_{w_k}^2, \quad \text{(Eqn. 1)}$$

wherein MSE is mean squared error, which is an estimate of transmission noise, x is signal magnitude, k is carrier index, n is symbol index, L is the number of symbols in a burst, w is noise samples and $\sigma_{w_k}^2$ is noise variance. ("^" indicates an estimated value.)

An alternative approach to noise estimation is a data directed approach. In data directed approach, a receiver scrambler is not required. A data directed approach requires the assumption that in the received signal, the signal-to-noise ratio ("SNR") is favorably high and that the decision is always correct.

For systems using BPSK modulation, in which only the real portion of a signal (i.e., the real portion of the mathematical model of a signal) is used in the decision, $$\tilde{x}_k(n) = sgn\{Re\{\hat{x}_k(n)\}\}, \quad \text{(Eqn. 2)}$$

in which $\tilde{x}_k(n)$ is the decision on the value of received data. When SNR is favorable, $\tilde{x}_k(n)$ is approximately equal to the sent data, $x_k(n)$.

In both cases described above, the estimation of the "transmitted" signal requires knowledge of the channel transfer function. Since the channel, in general, is unknown, part of the received data sequence is used for channel estimation. Channel estimation based on noisy samples has an error that induces estimation bias in both procedures described above. The bias may be shown by defining new random variable $y_k(n)$ as follows:

$$y_n(n) = \hat{x}_k(n) - \text{sgn}\{\text{Re}\{\hat{x}_k(n)\}\} \quad \text{(Eqn. 3)}$$

$$= \frac{\hat{h}_k^*}{|\hat{h}_k|^2}(h_k x_k(n) + v_k(n)) - \text{sgn}\{\text{Re}\{\hat{x}_k(n)\}\}$$

$$= \frac{\hat{h}_k^*}{|\hat{h}_k|^2} v_k(n)$$

$$= w_k(n),$$

wherein h is a channel transfer function, v is channel noise before equalization and "*" indicates a complex conjugate.

If channel estimation does not include error, then The mean of $y_k(n)$ is zero. The variance of $y_k(n)$ is exactly the noise variance, as follows:

$$\hat{MSE}_k = \frac{1}{L}\sum_{n=1}^{L}|\hat{x}_k(n) - \text{sgn}\{\text{Re}\{\hat{x}_k(n)\}\}|^2 \quad \text{(Eqn. 4)}$$

$$= \frac{1}{L}\sum_{n=1}^{L}|(x_k(n) + w_k(n)) - \text{sgn}\{\text{Re}\{\hat{x}_k(n)\}\}|^2$$

$$= \frac{1}{L}\sum_{n=1}^{L}|w_k(n)|^2 \approx \sigma_{w_k}^2.$$

Equation 4 shows that the expectation of $y_k$ is the noise variance. (The expectation is therefore, in mathematical terms, "unbiased.") The received signal, however, is accepted for analysis only after it undergoes channel estimation. Since the channel estimation is based on a noisy signal, the estimation includes error. The error may be constant over the burst. The error biases the MSE and, thus the estimate of transmission noise.

The received signal may more accurately be described by the random variable ψ, as follows:

$$\psi_k(n) = \hat{x}_k(n) - \text{sgn}\{\text{Re}\{\hat{x}_k(n)\}\} \quad \text{(Eqn. 5)}$$

$$= \left(\frac{h_k^*}{|h_k|^2} + e_k\right)(h_k x_k(n) + v_k(n)) - x_k(n)$$

$$= x(k)h_k e_k + (1 + h_k e_k)w_k(n),$$

wherein $e_k$ is error in the channel estimation for carrier channel k. Based on Eqn. 5:

$$E\{\psi_k\}=0, \text{ and} \quad \text{(Eqn. 6)}$$

$$E\{|\psi_k|^2\}=(h_k e_k)+(1+h_k e_k)^2\sigma_{w_k}^2. \quad \text{(Eqn. 7)}$$

The estimation of the noise based on the equalized signal is thus biased and stretched. The bias and stretch may be different for each burst.

It would therefore be desirable to provide apparatus and methods for removing bias from estimates of transmission noise.

SUMMARY OF THE INVENTION

It is an object of the invention to provide apparatus and methods for removing bias from estimates of noise in a signal. Apparatus and methods for estimating channel noise, substantially as shown in and/or described in connection with at least one of the figures, and as set forth more completely in the claims, are therefore provided.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF EMBODIMENTS

Figure 1:
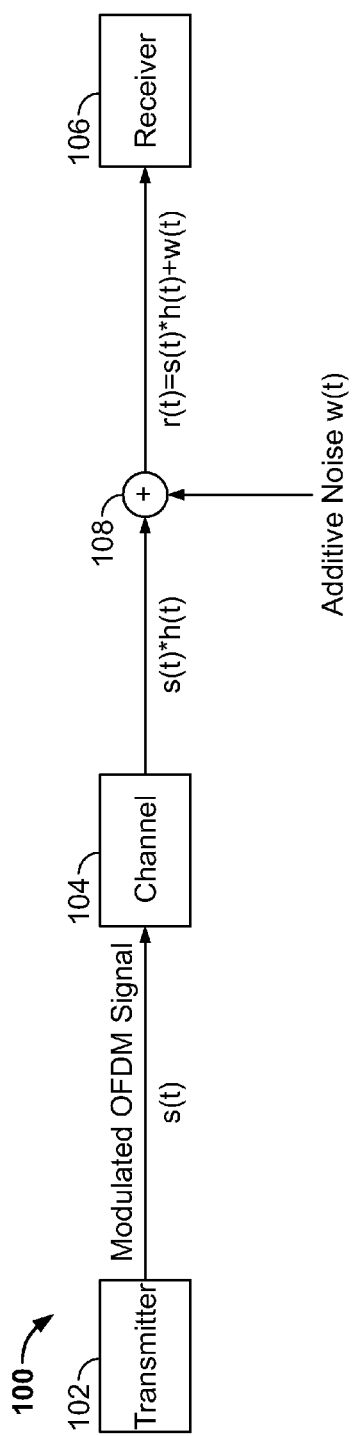
FIG. 1 is a schematic diagram illustrating apparatus that may be used in accordance with the principles of the invention.

Apparatus and methods for estimating transmission noise in a programming information signal are provided. The methods may include a method for estimating channel noise power in binary phase shift keying ("BPSK") modulated telecommunication. Such a method may include receiving over the channel a first known signal. The first known signal may have an identified functional form. The method may include formulating a channel transfer function estimate for the channel. The channel transfer function estimate may be based on the first known signal and may include a channel estimation error. The method may include receiving over the channel a second BPSK signal. The second BPSK signal may include the programming information. The second BPSK signal may include noise. The noise may be quantified in terms of power. The method may include equalizing the second BPSK signal using the transfer function estimate. The method may include estimating the second BPSK signal noise power in such a manner that the noise power estimate is substantially independent of the channel estimation error, as described below.

In BPSK modulation, only the real portion of an equalized signal is used in the signal identification decision, so $x_k(n)$ sgn$\{\text{Re}\{\hat{x}_k(n)\}\}=1$. A new random variable $z_k$ may be defined as follows:

$$z_k(n) = \hat{x}_k(n)\text{sgn}\{\text{Re}\{\hat{x}_n(n)\}\} - 1 \quad \text{(Eqn. 8)}$$

$$= \left(\frac{\hat{h}_k^*}{|\hat{h}_k|^2} + e_k\right)(h_k x_k(n) + v_k(n))\text{sgn}\{\text{Re}\{\hat{x}_k(n)\}\} - 1$$

$$= h_k e_k + x_k(n)\left(\frac{\hat{h}_k^*}{|\hat{h}_k|^2} + e_k\right)v_k(n)$$

$$= h_k e_k + x_k(n)(1 + h_k e_k)w_k(n).$$

The mean of $z_k(n)$ is proportional to the channel estimation error. The second moment of $z_k(n)$, which is equal to the second moment of $\psi_k(n)$ (see Eqn. 7), is:

$$E\{z_k\} = h_k e_k, \text{ and } E\{|z_k|^2\} = (h_k e_k)^2 + (1 + h_k e_k)^2\sigma_{w_k}^2. \quad \text{(Eqn. 9)}$$

The variance of $z_k(n)$, then, is

-continued $$\text{Var}\{\hat{z}_k(n)\} = \frac{1}{L}\sum_{n=1}^{L}|\hat{x}_k(n)\text{sgn}\{\text{Re}\{\hat{x}_k(n)\}\} - \frac{1}{L}\sum_{m=1}^{L}\hat{x}_k(m)\text{sgn}\{\text{Re}\{\hat{x}_k(m)\}\}|^2 \qquad \text{(Eqn. 10)}$$
$$= E\{|z_k|^2 - |E\{z_k\}|^2$$
$$= (1+h_ke_k)^2\sigma_{w_k}^2.$$

The unbiased noise estimation can be written as $$\hat{\sigma}_{w_k}^2 = \frac{\frac{1}{L}\sum_{n=1}^{L}|z_k(n)|^2 - \left|\frac{1}{L}\sum_{n=1}^{L}z_k(n)\right|^2}{\left|1+\frac{1}{L}\sum_{n=1}^{L}z_k(n)\right|^2}. \qquad \text{(Eqn. 11)}$$

When SNR is high, $$\left|1+\frac{1}{L}\sum_{n=1}^{L}z_k(n)\right|^2 \approx 1, \qquad \text{(Eqn. 12)}$$

so $$\hat{\sigma}_{w_k}^2 \approx \frac{1}{L}\sum_{n=1}^{L}|z_k(n)|^2 - \left|\frac{1}{L}\sum_{n=1}^{L}z_k(n)\right|^2. \qquad \text{(Eqn. 13)}$$

To evaluate the unbiased noise estimation, as approximated by Eqn 13, the following variables may be calculated using a logic circuit, a software routine or any other suitable approach.

$$z_k(n) = x_k(n)\text{sgn}(\text{Re}\{x_k(n)\}) - 1 \qquad \text{(Eqn. 14)}$$

$$A_k = \sum_{n=1}^{L}|z_k(n)|^2 \qquad \text{(Eqn. 15)}$$

$$B_k = \sum_{n=1}^{L}z_k(n) \qquad \text{(Eqn. 16)}$$

Illustrative features of the invention are described below with reference to FIGS. 1-3. As will be appreciated by one of ordinary skill in the art, features of the invention that are described herein may be embodied as a method, data processing apparatus, a data processing system or a computer program. Accordingly, the features may take the form of an entirely hardware embodiment, an entirely software embodiment or an embodiment combining software and hardware aspects. Furthermore, some features may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative OFDM communication system model 100. Model 100 may include transmitter 102, channel 104 and receiver 106. Transmitter 102 may transmit programming information, in the form of modulated OFDM signal s(t), via channel 104. The programming information may be modulated by BPSK. Channel 104 may be cable, optical fiber, wire, air or space. Channel 104 may affect signal s(t) with distortion h(t) such that receiver 106 receives s(t)*h(t), which is the convolution of s(t) and h(t). Noise w(t) contributes to the received signal as shown at additive model junction 108. Receiver 106 therefore receives signal r, which is modeled as:

$$r(t)=s(t)*h(t)+w(t) \qquad \text{(Eqn. 17)}$$

Figure 2:
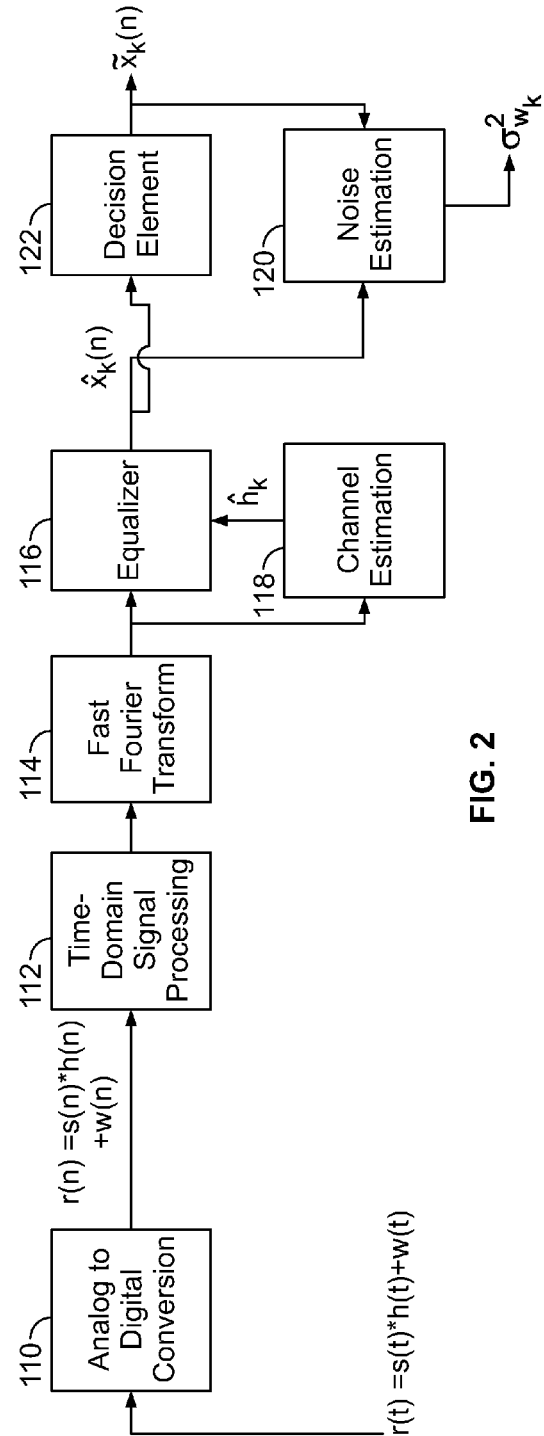
FIG. 2 is a schematic diagram illustrating a portion of the apparatus shown in FIG. 1.

FIG. 2 shows more detail of illustrative receiver 106 (shown in FIG. 1). Receiver 106 may include analog-to-digital converter 110, time-domain signal processing module 112, fast Fourier transform module 114, equalization module 116, channel estimation module 118, noise estimation module 120 and decision module 122.

Analog-to-digital signal converter 110 may convert r(t) to r(n), which may be a time-domain digital signal. Time-domain signal processing module 112 may perform signal acquisition, filtering, up-sampling, down-sampling or any other suitable functions. The output of time-domain signal processing module 112 may be input to fast Fourier transform module 114.

Fast Fourier transform module 114 may output a frequency-domain signal that includes encoded data. Equalizer 116 removes channel effect h(t) from the spectrum by deconvolution, inversion or any other suitable approach. Channel estimation module 118 generates frequency-dependent channel transfer function $\hat{h}_k$ based on the spectrum from fast Fourier transform module 114. Channel estimation module 118 provides $\hat{h}_k$ to equalizer 116 to remove channel effect h(t). Equalizer 116 transmits output $\hat{x}_k(n)=x_k(n)+v_k(n)$ to decision module 122 (see FIG. 1).

Output $\hat{x}_k(n)$ is then used by decision module 122 to generate frequency-domain programming information signal $\tilde{x}_k(n)$. Noise estimation module 120 may use output $\hat{x}_k(n)$ from equalizer 116 and output $\tilde{x}_k(n)$ from decision module 122 to calculate estimate $\sigma_{w_k}^2$ of noise power, which may be evaluated in accordance with Eqn. 13.

Figure 3:
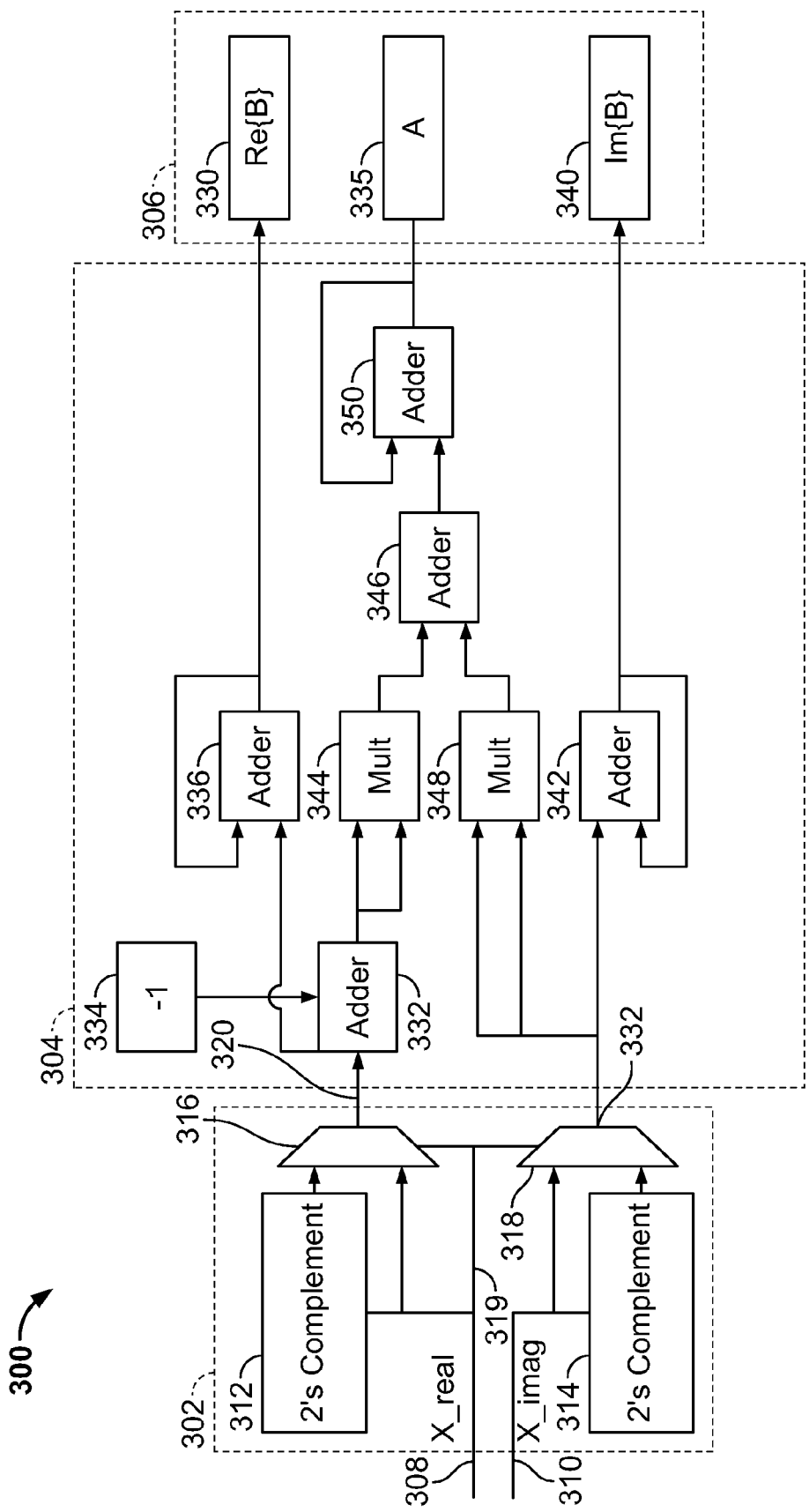
FIG. 3 is a schematic diagram illustrating apparatus in accordance with the principles of the invention.

FIG. 3 shows a schematic diagram of illustrative circuit 300 that may be present in noise estimation module 120 to evaluate Eqn. 13. Circuit 300 may include preconditioning circuit 302, logic circuit 304 and register array 306. Preconditioning circuit 302 may receive input signal 308 and input signal 310. Input signals 308 and 310 may correspond to the real and imaginary parts, respectively, of equalizer output $\hat{x}_k(n)$. Preconditioning circuit 302 may have one channel for conditioning the real part of output $\hat{x}_k(n)$ and one channel for conditioning the imaginary part of output $\hat{x}_k(n)$. In the example shown in FIG. 3, decision circuitry is included in preconditioning circuit 302 and is represented by sign bit line 319.

Each channel may include circuitry for 2's complement conversion tables 312 and 314. Each channel may include a selector such as 316 and 318 for selection of the inverted or non-inverted bits of the real and imaginary parts of the signal. Sign bit 319 may cause preconditioning circuit 302 to select the inverted or non-inverted real and imaginary parts of $z_k(n)$ (set forth in Eqn. 14). The real and imaginary parts of $z_k(n)$ are provided at precondition circuit outputs 320 and 322, respectively.

The logic path for calculation of the real portion 330 of B (see Eqn. 16) includes output 320 of preconditioning circuit 302 and adder block 332 for adding to output 320 the constant −1 from register 334. The path then includes adder block 336 for accumulating a sum of L values of the real portion of $y_k(n)$, where L is the number of OFDM symbols in a burst.

The logic path for calculation of the imaginary portion 340 of B (see Eqn. 16) includes output 322 of preconditioning circuit 302 and adder block 342 for accumulating a sum of L values of the imaginary portion of $y_k(n)$.

The logic path for calculation of A (335), which is purely real (see Eqn. 15) includes outputs 320 and 322 of preconditioning circuit 302. The signal from output 320 is passed through adder 332 for the addition of the constant −1 from register 334. Multiplier block 334 squares the result of adder block 332 and feeds the resulting product to adder block 346. Multiplier block 348 generates a squared value of the imaginary portion of $y_k(n)$ based on output 322 of preconditioning circuit 302. The results of multiplier blocks 334 and 348 are added together in adder block 346. Adder block 350 accumulates a sum of L values of the output of adder block 346.

The values Re{B} (330), A (335) and Im{B} (340) may be stored in one or more registers. The values may be combined in accordance with Eqns. 13-16 to quantify $\sigma_{w_k}^2$, which is an estimate of noise power that is not dependent on channel estimation error $e_k$, in Eqn. 10. Eqns. 13-16 may be evaluated using hardware or software.

Figure 4:
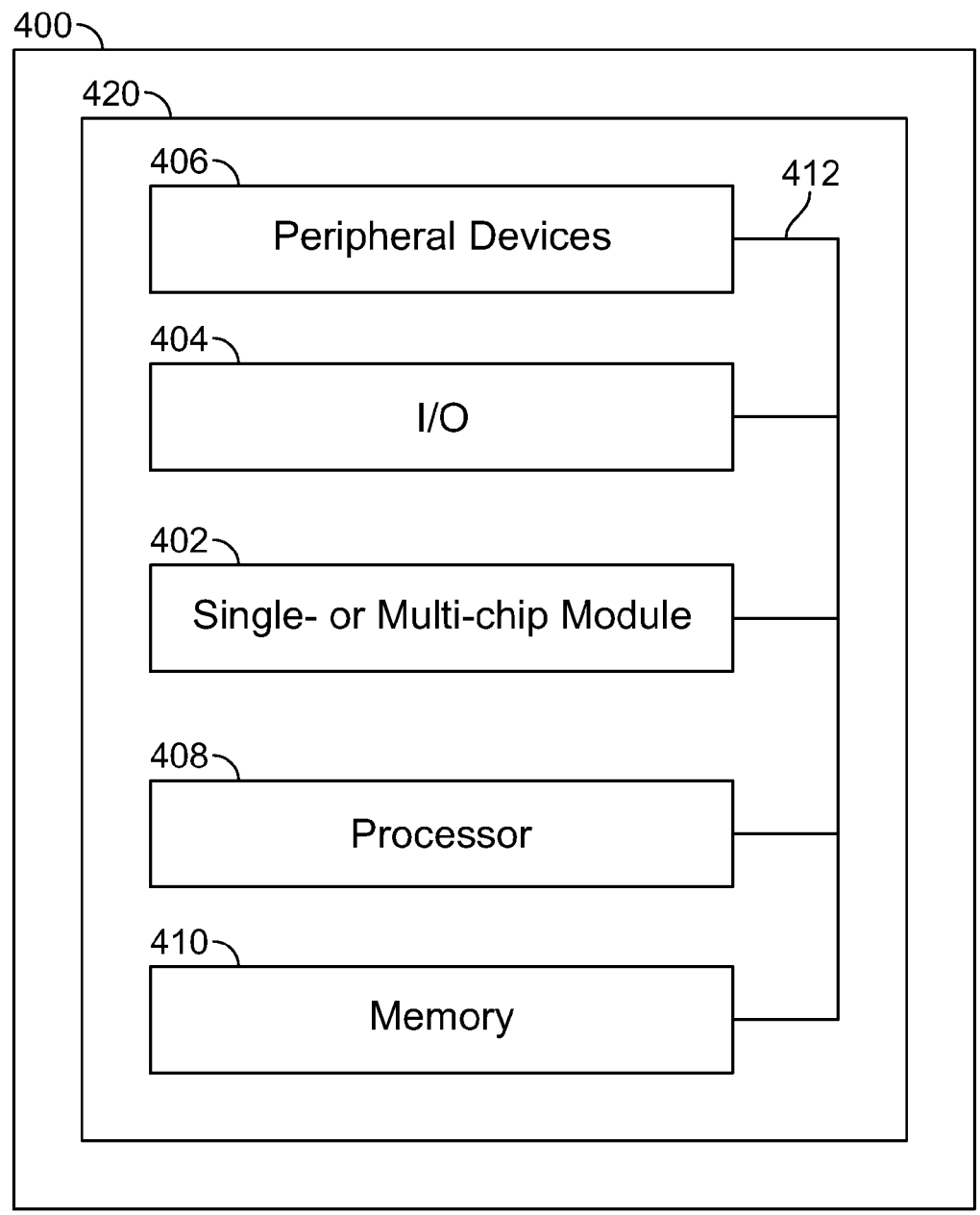
FIG. 4 is a schematic diagram illustrating other apparatus in accordance with the principles of the invention.

FIG. 4 shows illustrative device 400, which may be an embodiment of device 106 (shown in FIG. 1). Device 400 may include some or all of the components that are shown in FIG. 2 and an embodiment of circuit 300 (shown in FIG. 3).

Device 400 may include single or multi-chip module 402, which can be one or more integrated circuits, and which may include logic configured to: perform mathematical operations on signals representing signal noise power or to perform any other suitable logical operations. Device 404 may include one or more of the following components: I/O circuitry 404, which may interface with coaxial cable, telephone lines, wireless devices, output devices, a keypad/display control device or any other suitable media or devices; peripheral devices 406, which may include counter timers, real-time timers, power-on reset generators or any other suitable peripheral devices; processor 408, which may control process flow; and memory 410. Components 402, 404, 406, 408 and 410 may be coupled by a system bus or other interconnections 412 and may be present on one or more circuit boards such as 420. In some embodiments, the components may be integrated into a single chip.

It will be appreciated that software components of the present invention including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively, be implemented wholly or partly in hardware, if desired, using conventional techniques.

Thus, apparatus and methods for detecting and contravening unauthorized use of devices are therefore provided. Persons skilled in the art will appreciate that the present invention can be practiced using embodiments of the invention other than those described, which are presented for purposes of illustration rather than of limitation. The present invention is limited only by the claims that follow.

What is claimed is:

1. A method for estimating channel noise power in binary phase shift keying (BPSK) modulated telecommunication, the method comprising:
receiving over the channel a first known signal, the first known signal having an identified functional form;
after receiving the first known signal, formulating a channel transfer function estimate for the channel, the channel transfer function estimate being based on the first known signal and including a channel estimation error;
receiving over the channel a second BPSK signal, the second BPSK signal including noise having a power;
equalizing the second BPSK signal using the transfer function estimate; and
estimating the second BPSK signal noise power, the noise power being substantially independent of the channel estimation error;
wherein:
the estimating comprises combining the second BPSK signal and the channel transfer function estimate into a combination having a combination noise power that corresponds to the second BPSK signal noise power;
if the combination noise power is substantially equal to zero:
(a) a mathematical product of the second BPSK signal and the channel transfer function estimate is substantially equal to one and
(b) the numerical value of the combination remains substantially constant when the estimation error changes; and
the combination noise power depends on:
(a) the mathematical product;
(b) a first sum resulting from the addition of squared combination signal values, each value corresponding to a different temporal segment of the combination signal; and
(c) a second sum resulting from the addition of the combination signal values.

2. The method of claim 1 wherein the temporal segment includes an orthogonal frequency domain multiplexing symbol.

3. A method for estimating channel noise power in binary phase shift keying (BPSK) modulated telecommunication, the method comprising:
receiving over the channel a first known signal, the first known signal having an identified functional form;
after receiving the first known signal, formulating a channel transfer function estimate for the channel, the channel transfer function estimate being based on the first known signal and including a channel estimation error;
receiving over the channel a second BPSK signal, the second BPSK signal including noise having a power;
equalizing the second BPSK signal using the transfer function estimate; and
estimating the second BPSK signal noise power, the noise power being substantially independent of the channel estimation error;
wherein:
the estimating comprises combining the second BPSK signal and the channel transfer function estimate into a combination having a combination noise power that corresponds to the second BPSK signal noise power;
if the combination noise power is substantially equal to zero:
(a) a mathematical product of the second BPSK signal and the channel transfer function estimate is substantially equal to one; and
(b) the numerical value of the combination remains substantially constant when the estimation error changes; and
the estimating further comprises splitting the combination into a first part and a second part, the first part corresponding to a real value and the second part corresponding to an imaginary value wherein the estimating further comprises feeding the first part of the combination into both a first adding device and a first multiplying device.

4. The method of claim 3 wherein the estimating further comprises feeding an output of the first adding device into an input port of the first adding device to generate a sum.

5. The method of claim 4 wherein, when the first multiplying device has a first input port and a second input port, the estimating further comprises:

feeding the first part of the combination into the first multiplying device at the first input port of the first multiplying device;

feeding the first part of the combination into the first multiplying device at the second input port of the first multiplying device; and propagating, from an output of the first multiplying device to a second adding device, a squared value of the first part of the combination.

6. The method of claim 5 wherein the estimating further comprises feeding into the second adding device a product formed in a second multiplying device, the product based on the second part of the combination.

7. The method of claim 6 wherein the estimating further comprises:

feeding an output of the second adding device into an input port of a third adding device; and feeding an output of the third adding device into the input port of the third adding device to generate a sum.

8. The method of claim 7 wherein the estimating further comprises:

feeding the second part of the combination into an input port of a fourth adding device; and feeding an output of the fourth adding device into the input port of the fourth adding device to generate a sum.

9. Apparatus for estimating noise power in a binary phase shift keying (BPSK) modulated signal transmitted over a channel, the signal having a noise power, the apparatus comprising:

a preconditioning circuit comprising a first preconditioning output port and a second preconditioning output port, the first preconditioning output port corresponding to a real part of the signal, the second preconditioning output port corresponding to an imaginary part of the signal; and a logic circuit in communication with the first and second preconditioning output ports, the logic circuit comprising: a first logic output port, a second logic output port and a third logic output port;

wherein:

the first logic output port provides a first value;

the second logic output port provides a second value;

the third logic output port provides a third value; and the first, second and third values together define an estimate of the noise power that is independent of channel transfer function estimation error.

10. The apparatus of claim 9 wherein the first logic output port corresponds to a first logic path comprising a first adder block in series with a second adder block;

wherein:

the first adder block is configured to add a constant to the real part of the signal; and the second adder block is configured to accumulate a sum of values in a data burst.

11. The apparatus of claim 9 wherein the second logic output port corresponds to a second logic path comprising:

a first multiplier block in communication with the first preconditioning output port;

a second multiplier block in communication with the second preconditioning output port;

a third adder block configured to receive output from both the first and the second multiplier blocks;

a fourth adder block configured to receive output from the third adder block and to accumulate a sum of values in a data burst.

12. The apparatus of claim 9 wherein the third logic output port corresponds to a third logic path comprising a fifth adder block in communication with the second preconditioning output port, the fifth adder block being configured to receive output from the second preconditioning output port and to accumulate a sum of values in a data burst.

13. The apparatus of claim 9 wherein the noise power is approximately $$\frac{\text{the second value}}{L} - \frac{1}{L^2} \cdot (\text{the first value} + i \cdot \text{the third value})^2,$$

wherein:

L is the number of orthogonal frequency domain multiplexing symbols in a burst; and i is $\sqrt{-1}$.

* * * * *